US 6,748,158 B1

(12) United States Patent
Jasinschi et al.

(10) Patent No.: US 6,748,158 B1
(45) Date of Patent: Jun. 8, 2004

(54) METHOD FOR CLASSIFYING AND SEARCHING VIDEO DATABASES BASED ON 3-D CAMERA MOTION

(75) Inventors: Radu S. Jasinschi, Ossining, NY (US); Thumpudi Naveen, Redmond, WA (US)

(73) Assignee: Grass Valley (U.S.) Inc., Nevada City, CA (US)

( * ) Notice: Subject to any disclaimer, the term of this patent is extended or adjusted under 35 U.S.C. 154(b) by 0 days.

(21) Appl. No.: 09/495,091

(22) Filed: Feb. 1, 2000

Related U.S. Application Data

(60) Provisional application No. 60/118,204, filed on Feb. 1, 1999, now abandoned.

(51) Int. Cl.[7] .................................................. H04N 5/91
(52) U.S. Cl. ....................... 386/69; 386/95; 348/208.99
(58) Field of Search .............................. 386/46, 69, 117, 386/95, 70; 348/208.99, 208.3, 699, 700, 416.1; 382/107; H04N 5/91

(56) References Cited

U.S. PATENT DOCUMENTS

| | | | | |
|---|---|---|---|---|
| 5,267,034 A | * | 11/1993 | Miyatake et al. | 348/208.99 |
| 5,809,202 A | * | 9/1998 | Gotoh et al. | 386/69 |
| 5,956,026 A | * | 9/1999 | Ratakonda | 345/328 |
| 6,504,569 B1 | * | 1/2003 | Jasinschi et al. | 348/43 |

* cited by examiner

*Primary Examiner*—Vincent Boccio
(74) *Attorney, Agent, or Firm*—Joseph S. Tripoli; Ronald H. Kurdyla; Joel M. Fogelson

(57) ABSTRACT

A method of indexing and searching a video database having a plurality of video shots uses 3-D camera motion parameters. For each video shot the 3-D camera motion parameters are estimated, rates of tracking, booming, dollying, panning, tilting, rolling and zooming are computed, and the results are indexed in a metadata index file in the video database according to the types of camera. The video database is searched by selecting one of the types of camera motion and submitting a query. The query is processed to identify those video shots in the video database that satisfy the query in order of priority. The highest priority video shots are displayed for the user.

6 Claims, 4 Drawing Sheets

METHOD FOR CLASSIFYING AND SEARCHING VIDEO DATABASES BASED ON 3-D CAMERA MOTION

CROSS-REFERENCE TO RELATED APPLICATIONS

This is a continuation of provisional U.S. Patent Application Serial No. 60/118,204 filed Feb. 1, 1999, now abandoned.

BACKGROUND OF THE INVENTION

The present invention relates to video data processing, and more particularly to a method for classifying and searching video databases based on 3-D camera motion.

Video is becoming a central medium for the storage, transmission, and retrieval of dense audio-visual information. This has been accelerated by the advent of the Internet, networking technology, and video standardization by the MPEG group. In order to process and retrieve efficiently large amounts of video information, the video sequence has to be appropriately indexed and segmented according to different levels of its contents. This disclosure deals with one method for video indexing based on the (global) camera motion information. The camera, as it captures a given scene, moves around in 3-D space and it consequently induces a corresponding 2-D image motion. For example, a forward-looking camera which moves forward induces in the image plane a dollying motion similar to an optical zoom in motion by which image regions increase in size, and they move out of view as they are approached. This kind of motion is very common in TV broadcast/cable news, sports, documentaries, etc. for which the camera, either optically or physically, zooms in or out or dollys forward and backward with respect to a given scene spot. This indicates the intention to focus the viewer's attention on particular scene parts. An analogously common camera motion is that of panning, for which the camera rotates about a vertical axis, thus inducing an apparent horizontal movement of image features. In this case the camera shows different parts of a scene as seen from the distance. This is also very common in TV programs, when the intention is that of giving the viewer a general view of a scene, without pointing to any particular details of it. In addition to dollying and panning, the camera may be tracking (horizontal translational motion), booming (vertical translational motion), tilting (rotation about the horizontal axis) and/or rolling (rotation about the forward axis). Taken together, these camera motions constitute a very general mode of communicating content information about video sequences which may be analyzed at various levels of abstraction. This is important for storage and retrieval of video content information which is going to be standardized by MPEG-7 by the year 2001.

What is desired is a general method of indexing and searching of video sequences according to camera motion which is based on full 3-D camera motion information estimated independently of the video contents, e.g., how the camera moves or how many objects there are in a given 3-D scene.

BRIEF SUMMARY OF THE INVENTION

Accordingly the present invention provides a method of classifying and searching video databases based on 3-D camera motion that is estimated independently of the video contents. Indexing and searching is realized on a video database made up of shots. Each video shot is assumed to be pre-processed from a long video sequence. For example, the MPEG-7 video test material is divided into CD-ROMs containing roughly 45 minutes of audio-video data (~650 Mbytes). The shots are either manually or automatically generated. A collection of these shots makes up a video database. Each shot is individually processed to determine the camera motion parameters and afterwards indexed according to different types of camera motion. Finally, the video database is searched according to user specifications of types of camera motion.

The objects, advantages and other novel features of the present invention are apparent from the following detailed description when read in conjunction with the appended claims and attached drawing.

DETAILED DESCRIPTION OF THE INVENTION

Figure 1:
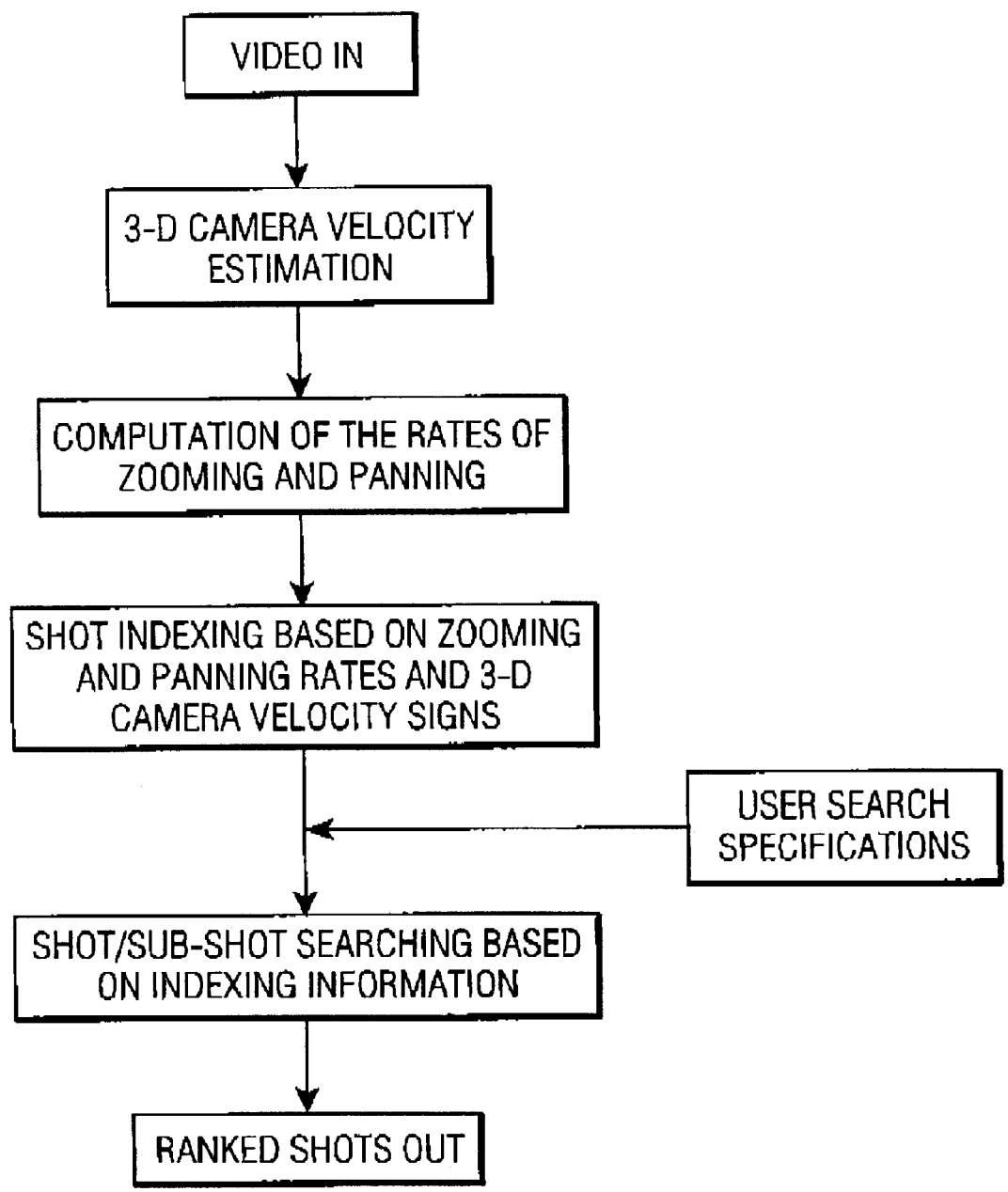
FIG. 1 is a block diagram view of an overall system for classifying and searching video databases according to the present invention.

Referring now to FIG. 1 the method of the current invention is summarized by the following steps. Given a video shot from a video database, the method:

1. Estimates 3-D camera motion;
2. Computes the amount of motion in the image as induced by the 3-D camera motion;
3. Indexes the shot by the type of camera motion, e.g., translational (tracking, booming, dollying) or rotational (panning, tilting, rolling), based on the amount of motion and the 3-D camera motion signs; and
4. Queries (or searches) for sub-shots or shot intervals based on the indexing information from step 3.

It should be remarked that the method may still be applied to indexing/search applications if the 3-D camera motion is obtained through another method than by using the essential matrix, as below, such as by using capture-time metadata information. The details of these four steps are explained below.

The first part of the method is the extraction of the 3-D camera motion. This uses a variant of a method proposed in U.S. patent application Ser. No. 09/064,889 filed Apr. 22, 1998 by Jasinschi et al entitled "2-D Extended Image Generation from 3-D Data Extracted from a Video Sequence". In summary, the camera motion is estimated for each consecutive pair of images by:

(a) Computing image feature points (corners) via the Kitchen-Rosenfeld corner detection operator,
(b) Computing image intensity contrast or variance variation; at each pixel the image intensity mean and the variance about this mean are computed within a rectangular window; a histogram of the variance for all pixels is computed; assuming that this histogram is unimodal, a mean and variance for this histogram are computed; pixels whose intensity contrast variance lies outside the histogram variance are not used.

(c) Tracking corner points; this uses a hierarchical matching method, as disclosed in the above-identified U.S. Patent Application.

(d) Pruning the matched corner points by verifying if each corner point has a MATCHINGGOODNESS value that is smaller than a given threshold; the MATCHING-GOODNESS is equal to the product of the image intensity contrast variance with the cross-correlation measure (used in (c)); this pruning method is used instead of the one proposed in the above-identifed U.S. Patent Application which verifies separately if a corner point has a cornerness value and a cross-correlation value which are separately below given threshold values.

(e) Tessellating the image into eight (8) contiguous rectangular regions; selecting, based on a pseudo-random number generator, one arbitrary corner point per rectangle.

(f) Computing the essential matrix E.

(g) Computing the translation T and rotation R matrices from E.

(h) Repeating steps (e)–(g) for a pre-determined number of times (such as 1000).

(i) Obtaining a single ("best") T and R.

The second part of the method consists in the computation of the amounts of motion in image coordinates. In the case of no rotational camera motion, the x and y image motion components of the ith feature point (in normalized coordinates) are given by:

$$v_x^i = f^*(x^i T_z - T_x)/Z^i,$$

$$v_y^i = f^*(y^i T_z - T_y)/Z^i,$$

where $T_x, T_y, T_z$ are the three translational world (camera) motion components defined with respect to the global 3-D Cartesian world coordinate system OX,OY,OZ with origin at point O, $Z^i$ is the 3-D depth associated with the ith feature point, f is the camera focal length, and $x^i, y^i$ are the feature point image coordinates (they vary between −1 to 1; the image in normalized image coordinates is of size 2×2 large).

Camera translational motion (tracking or booming), occurs when $T_z=0$, and either (or both) $T_x \neq 0, T_y \neq 0$. The amount of translational motion is defined by the "area" in the image induced by the camera motion; this area is given by a vertical (for horizontal—OX) motion or horizontal (for vertical—OY) motion stripe. The thickness of these stripes is proportional to $v_x, v_y$; in order to obtain a more robust value for these areas, an average over many feature points is taken: an imaginary vertical (horizontal) line is used, say passing through the image center, and the velocity of all feature points close to this line (by a given tolerance distance) is computed; this requires the knowledge of depth values which are computed as in the above-identified U.S. Patent Application. This gives the areas for vertical and horizontal translation:

$$a_x = |T_x/\langle Z \rangle|,$$

$$a_y = |T_y/\langle Z \rangle|,$$

where $\langle Z \rangle$ is the average depth of the features on the imaginary line(s); the operator $\langle . \rangle$ takes the average value of a given variable. The sign of the direction of motion is that of $T_x, T_y$ given by:

$$\text{sign}(T_x) = T_x/|T_x|,$$

$$\text{sign}(T_y) = T_y/|T_y|.$$

The convention used is:
(a.1) right tracking: sign($T_x$)<0
(a.2) left tracking: sign($T_x$)>0
(b.1) upward booming: sign($T_y$)>0
(b.2) downward booming: sign($T_y$)<0

This completes the description of the translational motion amounts.

Dollying is defined for $T_x=T_y=0$, and $T_z \neq 0$. The dollying amount of motion is defined by the area spanned by an annulus centered about the image center in normalized coordinates. All feature points in the vicinity of an imaginary circle, centered about the image center, have their image velocities computed; due to pure dollying they move either forward or backward, thus generating a circle of smaller or larger size. It can be shown that the annulus area for a single feature is equal to:

$$a_z^i = \pi((v_x^i)^2 + (v_y^i)^2 + 2v_x^i x^i + 2v_y^i y^i)$$

Using that, for pure dollying, $$v_x^i = (x^i T_z)/Z^i,$$

$$v_y^i = (y^i T_z)/Z^i,$$

we get that:

$$a_z^i = \pi(((x^i)^2 + (y^i)^2) * ((T_z/Z^i)^2 + 2T_z/Z^i))$$

This equation is normalized by dividing by the area of the circle, i.e., by $\pi((x^i)^2 + (y^i)^2)$. This provides a quantity that is independent of the imaginary circle's area. An average of $a_z^i$ is taken over all the feature points inside a region of confidence defined in a neighborhood of the imaginary circle. Thus the amount of dollying is:

$$a_z = (T_z)^2/\langle Z^2 \rangle + 2T_z/\langle Z \rangle.$$

The sign for the dolly motion is given by that of $T_z$:
(a.1) dolly forward: sign($T_z$)<0
(a.2) dolly backward: sign($T_z$)>0

It should be remarked that a circle in the normalized image coordinate system maps to an ellipse in the un-normalized (raster scan) coordinate system. This is important because, as it is known, dollying is associated with radially symmetric lines which meet at the FOE (FOC) and which are perpendicular to circles of constant image velocity. This completes the description of the dollying motion.

For rotational camera motion the amount of motion for panning and tilting is given by $a_{pan} = \Omega_y$ and $a_{tilt} = \Omega_x$, where $\Omega_x = -R_{2,3}$ and $\Omega_y = -R_{1,3}$, given that $R_{ij}$ ($1 \leq i, j \leq 3$) is an element of the rotational motion matrix R. Finally for rolling $a_{roll} = 2/(2+\tan(\Omega_z))$, where $\Omega_z = -R_{1,2}$.

The focus of expansion (FOE) or the focus of contraction (FOC) are a complement to these amounts of motion; the FOE (FOC) is the (imaginary) point in the image at which all image motions have their directions converge, such that they point from it (at it). Its position is defined by:

$$x_0 = T_x/T_z,$$

$$y_0 = T_y/T_z,$$

The FOE (FOC) may be used to discriminate points in the scene at which the viewer should focus his attention, say a news speaker or a sports athlete.

The description of video data may be at different levels of temporal granularity. The description may be on a frame-by-frame basis or in terms of elementary segments. The frame-by-frame basis description contains the full information about the camera motion. The elementary segment descriptor is based on a building block descriptor. Using the concept of elementary segment descriptor gives flexibility in the resolution of the descriptor.

Given a time window on a given video data, the camera motion descriptor describes the video data in terms of the union of separate elementary segments, say of track, boom, dolly, tilt, roll and pan, or in terms of the union of joint elementary segments, say the joint description of track, boom, dolly, tilt, roll and pan. These two approaches are discussed below. A shot/sub-shot description gives an overall view of the camera motion types and motion amount present in that shot/sub-shot.

Figure 5:
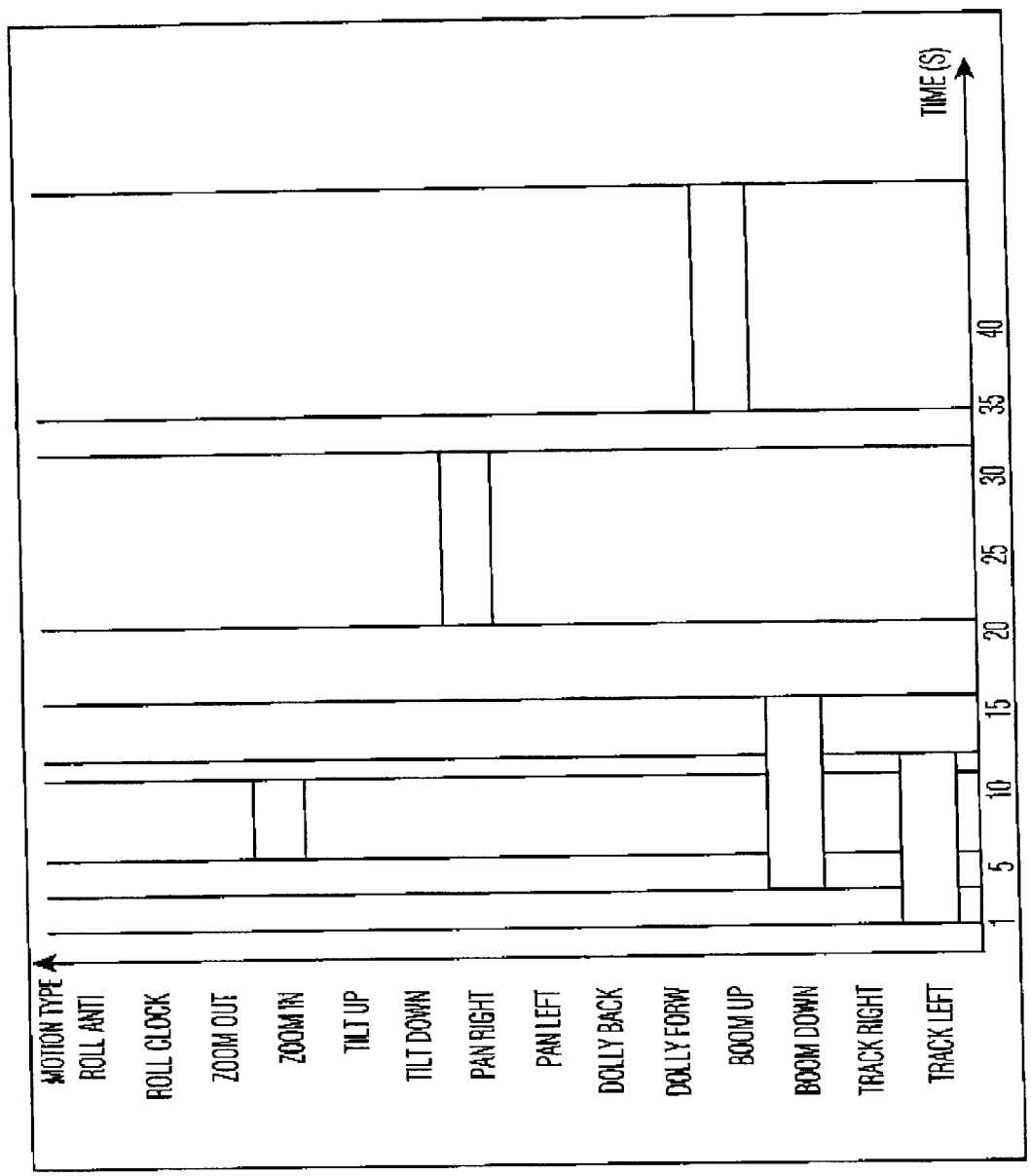
FIG. 5 is a graphic view of camera motion modes versus time for a video shot according to the present invention.

FIG. 5 shows an example of a distribution of motion types as they occur over time for given video data. The camera motion descriptor may describe the elementary segments, shown as white rectangles, either as a mixture or non-mixture of these. The mixture mode captures the global information about the camera motion parameters, disregarding detailed temporal information, by jointly describing multiple motion types, even if these motion types occur simultaneously. This level of detail is sufficient for a number of applications.

On the other hand the non-mixture mode captures the notion of pure motion type and their union within certain time intervals. The situations where multiple motion types occur simultaneously are described as a union of the description of pure motion types. In this mode of description the time window of a particular elementary segment may overlap with the time window of another elementary segment. This enhanced level of detail is necessary for a number of applications.

The fractional presence of a motion type ($\Delta_{motion\_type}$) within a given sequence of frames is defined as follows. Let total_duration be the duration of the temporal window for a given description. Then $$\Delta_{motion\_type} = duration_{motion\_type}/total\_duration$$

where $\Delta_{motion\_type}$ represents the length in time for which the motion type occurs.

The "amount of motion" parameters describe "how much" of track, boom, dolly, pan, tilt, roll and zoom there is in an image. They depend upon the camera parameters. The amount of motion for a given camera motion type is defined as the fraction of the image, an area expressed in normalized coordinates, that is uncovered or covered due to a given camera motion type. The amount of motion may also be computed as the average of the displacement of feature points in the images. These features may be prominent image points, such as "corner" points detected through a corner point detector, or points describing the shape of simple geometrical objects, such as the corner of a rectangle. These parameters are independent of the video encoding format, frame rate or spatial resolution.

The camera motion descriptor is defined in the following Table:

| CameraMotionDescriptor | |
| --- | --- |
| NumSegmentDescription | int |
| DescriptionMode | int |
| Info[NumSegmentDescription] | SegmentedCameraMotion |

The NumSegmentDescription is the number of elementary segments being combined through the union operation. If DescriptionMode=0, this corresponds to the non-mixture mode, and if DescriptionMode=1, this corresponds to the mixture mode.

SegmentedCameraMotion is defined in the following Table:

| Segmented CameraMotion | |
| --- | --- |
| start_time | TimeStamp |
| duration (sec.) | float |
| presence | FractionalPresence |
| speeds | AmountofMotion |
| FOE/FOC: horizontal position | float |
| FOE/FOC: vertical position | float |

The FOE/FOC parameters determine the position of the FOE/FOC when dolly/zoom is present.

The FractionPresence is defined in the following Table:

| FractionalPresence | |
| --- | --- |
| TRACK_LEFT[0...1] | float |
| TRACK_RIGHT[0...1] | float |
| BOOM_DOWN[0...1] | float |
| BOOM_UP[0...1] | float |
| DOLLY_FORWARD[0...1] | float |
| DOLLY_BACKWARD[0...1] | float |
| PAN_LEFT[0...1] | float |
| PAN_RIGHT[0...1] | float |
| TILT_UP[0...1] | float |
| TILT_DOWN[0...1] | float |
| ROLL_CLOCKWISE[0...1] | float |
| ROLL_ANTICLOCKWISE[0...1] | float |
| ZOOM_IN[0...1] | float |
| ZOOM_OUT[0...1] | float |
| FIXED[0...1] | float |

The AmountofMotion is defined in the following Table:

| AmountofMotion | |
| --- | --- |
| TRACK_LEFT[0...1] | float |
| TRACK_RIGHT[0...1] | float |
| BOOM_DOWN[0...1] | float |
| BOOM_UP[0...1] | float |
| DOLLY_FORWARD[0...1] | float |
| DOLLY_BACKWARD[0...1] | float |
| PAN_LEFT[0...1] | float |
| PAN_RIGHT[0...1] | float |
| TILT_UP[0...1] | float |
| TILT_DOWN[0...1] | float |
| ROLL_CLOCKWISE[0...1] | float |
| ROLL_ANTICLOCKWISE[0...1] | float |
| ZOOM_IN[0...1] | float |
| ZOOM_OUT[0...1] | float |

The FractionPresence and AmountofMotion data structures are expressed in the UML language, as suggested by the MPEG-7 community. The symbol [0 . . . 1] means that the field is optional. The operation of union of elementary segments may be realized with disjoint or overlapping time windows. If the DescriptionMode in CameraMotionDescriptor is 0, then inside each entry in the vector info[.] the "fractional presence" and the "AmountofMotion" have one and only one entry, i.e., for the "fractional presence" one entry with value 1 and the rest with value 0. This way the optional fields allow the descriptor to represent either mixture of motion types or a single motion type.

The fourth part of this method describes how to index video shots according to camera motion parameters. One set of parameters used for this indexing are the tracking, booming and dollying rates. These are complemented by the signs of the three translational camera motion parameters. Additionally the degree of tracking, booming or dollying is used. For this the ratio between the tracking, booming and dollying rates is computed. For indexing with respect to pure dollying, how much larger the dollying rate $a_z$ is compared to the tracking and booming rates $a_x, a_y$ is determined. Typically a ratio is used that goes from 1.0 to 5.0; in using 1.0, shots are indexed which contain camera dollying, but which may also have an equal share of camera tracking and booming; on the other hand a value of 3.0 puts a more stringent indexing of shots containing "strong" camera dollying. For indexing with respect to tracking and booming, how much larger the tracking and booming rates are compared to the dollying rate is determined. Similar ratios between 1.0 and 5.0 are used.

This indexing is realized on metadata files containing camera motion parameters, rates of tracking, booming and dollying, and the FOE (FOC). Given a video shot database, a set of specifications is used, say, indexing the shots for "strong" dolly in. The indexing result is shown in a file containing all the shots in the database with a string of zeros (0) and ones (1), the time intervals for which an event occurs, and a number between 0 and 1 giving the number of 1s with respect to the total number of frames in the shot. The 0/1 string determines if a given frame has an event (panning, zooming), thus 1, or does not have it, thus 0. In order to make the results more consistent, this string of 0s and 1s is post-processed by: 1. Deleting isolated 1s, i.e., flanked, on both sides by, at least, two zeros; 2. Filling in gaps with 1, 2, and 3, contiguous 0s, i.e., with the configurations 101, 1001, and 10001; these were transformed to 111, 1111, and 11111, respectively; 3. Removing isolated 1s at the boundaries, i.e., for string start 100 goes to 000, and for string end 001 goes to 000. Based on these numbers the shots in the database are rated in decreasing order.

Figure 2:
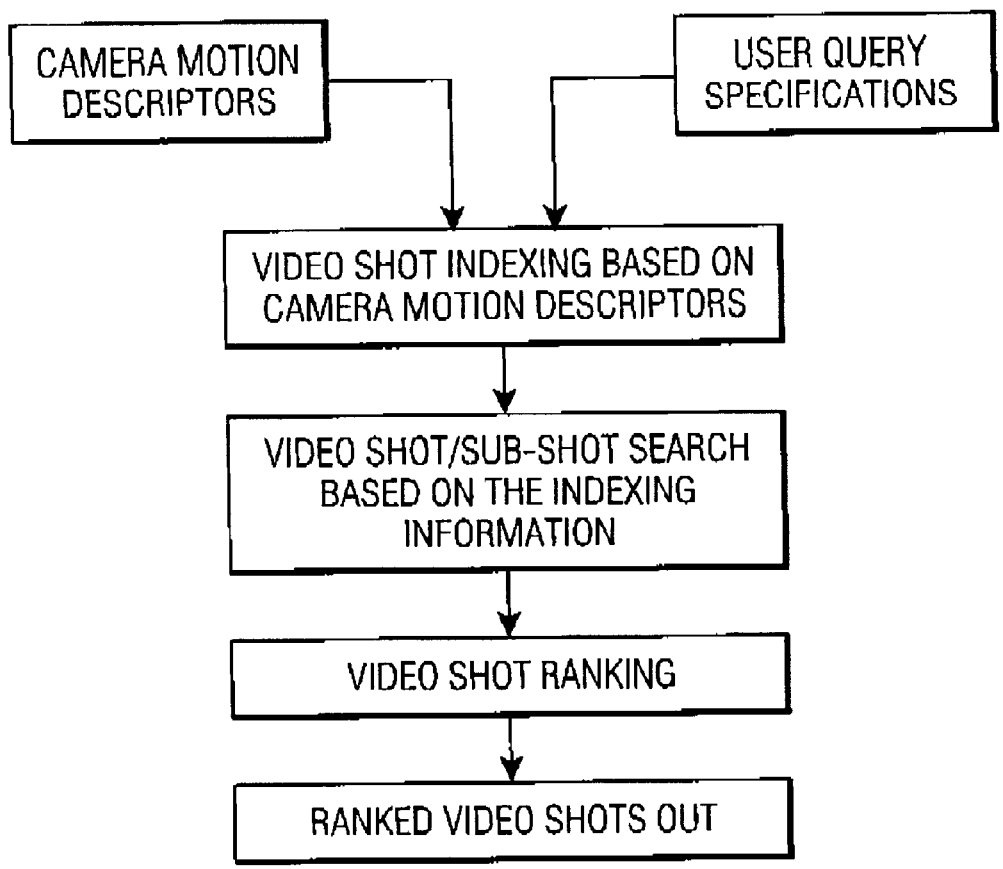
FIG. 2 is a block diagram view of a system for video shot querying according to the present invention.

The video shot query is done based on the user specifications, i.e., the user wants the query for "strong" dollying and uses the descriptors extracted as discussed above. More specifically given the metadata files containing the camera motion parameters and the rates of tracking, booming and dollying, and a set of user specifications, the query is realized on a video shot database, as shown in FIG. 2.

A graphical user interface (GUI) is used as an interface for the query. The user specifies:

A. What type of camera motion, tracking, booming or dollying, he wants to query on:
  1. dolly forward,
  2. dolly backward,
  3. track right
  4. track left
  5. boom up
  6. boom down.

One of these six options are clicked by the user in a specially designed box.

B. The degree of tracking, booming or dollying. This degree is given by the ratio between the tracking, booming and dollying rates. For indexing with respect to pure dollying, how much larger the dollying rate is compared to the tracking and booming rates is determined. Typically a ratio is used that goes from 1.0 to 5.0; 1.0 denotes indexing of shots containing camera dollying, but also have an equal share of tracking and booming; while a value of 3.0 puts a more stringent indexing of shots containing "strong" dollying. For indexing with respect to tracking or booming, how much larger the tracking or booming rates are compared to the dollying rate is determined. Similar ratios between 1.0 and 5.0 are used. This is chosen in the graphical user interface by a horizontal scrolling bar. Once item A is specified, the user chooses the degree of tracking/booming/dollying by positioning the scrolling bar at the appropriate position.

Figure 3:
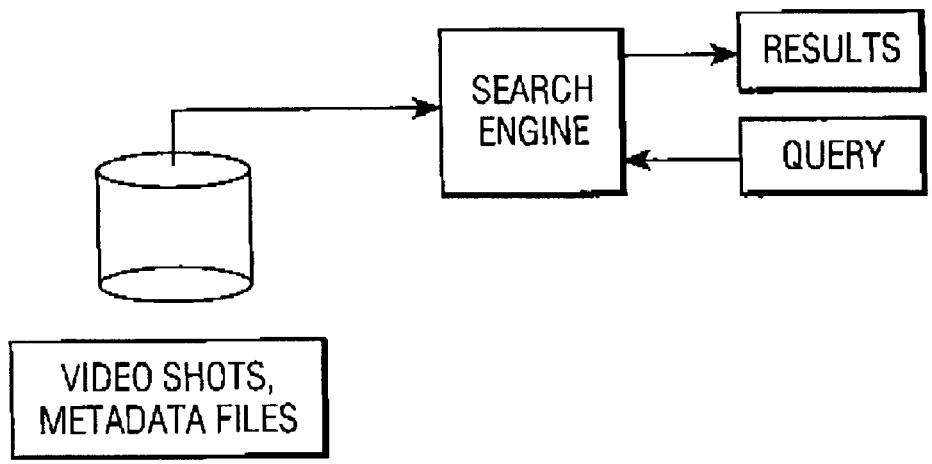
FIG. 3 is a block diagram view of a search system according to the present invention.

After this the user submits the query on the system shown in FIG. 3. As a result the GUI displays the four best ranked shots by displaying a thumbnail of each shot, with a timeline of frames showing the highlighted ranked frames. Finally the user plays each of the four shots between the ranked frames.

The query result is shown in a file containing all the shots in the database with a string of zeros and ones. The 0/1 string determines if a given frame has an event (panning or zooming). This string may be further compressed by using techniques, such as run length/arithmetic coding, for efficient storage and transmission.

Figure 4:
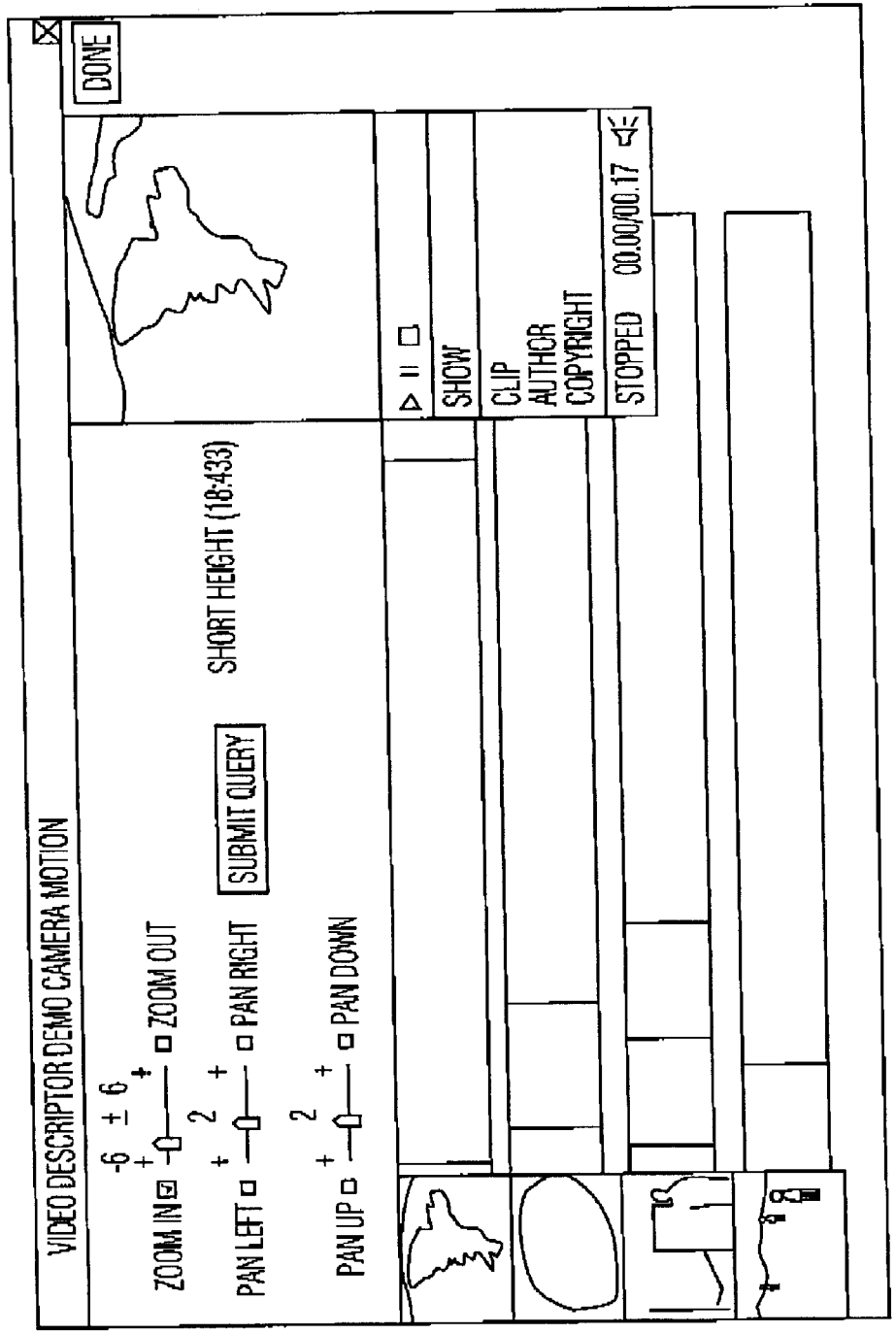
FIG. 4 is a plan view of a screen showing the results of a video database search based on camera motion according to the present invention.

FIG. 4 shows the result of a query for dolly forward. The search was done using a video shot database consisting of a total of 52 shots. These shots were manually chosen from the MPEG-7 video test material. For each shot, camera motion parameters were extracted per successive pairs of frames. The per frame processing time varied depending on the image intensity information quality, e.g., images with strong contrast and "texture" information were rich in feature points, thus allowing an adequate camera parameter estimation, while other images with poor or almost nonexistent contrast information did not permit an adequate estimation. On average this processing time was about 2 mins., varying between 1–3 mins. After all the 52 shots were processed, they were indexed. The resulting metadata files were stored.

As an example of a camera parameter metadata file below are the first 3 lines for a shot which has a total of 192 processed frames:

192 13

3 0.124551 −0.279116 0.952146 151.417717 28.582283
111.794757 68.205243 107.560949 72.439051
0.212731 −0.212731 0.212731 4 0.121448 −0.545849
0.829035 178.158197 1.841803 90.481436 89.518564
91.777726 88.222274 0.290051 −0.290051 0.290051 5
0.006156 −0.411413 0.911428 163.579885 16.420115
93.838807 86.161193 74.059700 105.940300
0.373067 −0.373067 0.373067

For example, the first three columns correspond to the (normalized) $T_x, T_y, T_z$ translational camera motion components (the translational motion is normalized to have the sum of its squares equal to 1.0). This shot shows very strong camera dolly backward; therefore $T_z > T_x, T_y$.

Following is an example of the indexing classification metadata file for the same shot.

192 10

<u>3</u> 0.109477 0.206756 0.683767 0.002532 0.004782 0.049684 0.001266 0.002391 0.029065

<u>4</u> 0.078388 0.335339 0.586273 0.001917 0.008200 0.045036 0.000958 0.004100 0.026346

<u>5</u> 0.003976 0.284010 0.712014 0.000096 0.006845 0.053912 0.000048 0.003423 0.031539.

The last three columns correspond to the tracking, booming and dollying rates; the effects of dolly backward show clearly: the dollying rate is larger than the tracking and booming rates.

Given the indexing specifications, the indexing is in almost real-time; it just requires parsing the metadata files. Together with this, the indexed shots are ranked according to the total number of frames/shot; the first four best ranked shots were shown via a GUI. Next, an example of an indexing metadata file is shown; this file resulted from a request for dolly forward for multiple shots:

shot03.bmp 1 1 1 1 1 1 1 1 1 1 1 1 1 1 1 1 1 1 1 1 1 1 1 0 0 0 0 0 0 0.774194 shot04.bmp 0 0 0 0 0 0 0 0 0 0 0 0 0 0 0 0 0 0 0 0 0 0 0 0 0 0 0 0 1 1 1 1 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 0.387665 shot05.bmp 0 0 0 0 0 0 0 0 0 1 1 1 0 0 0 0 0 0 0 0 0 0 0 0 0 0 0 0 0 0 0 0 0 0 0 0 0 0 0 0 0 0 0 0 0 0 0 0 0 0 0 0 1 1 1 1 1 1 1 0 0 0 0 0 0 0 0 1 1 0 0 0 0 0 0 0 0 0 0 0 0 0 0 0 0 0 0 0 0 0 0 0 0 0 0 0 0 0 0 1 1 1 0 0 0 0 0 0 0 0 0 0 0 0 0 0 0 0 0 0 0 0 0 0 0 0 0 0 0 0.126984 shot06.bmp 0 0 0 1 1 1 1 1 1 1 1 1 1 1 1 1 1 1 1 1 1 1 1 1 1 1 1 1 1 1 1 0.903226.

For each shot, the first string identifies it, followed by s string of 0s and 1s; the last (floating point) number is an index that gives the ratio of 1s divided by the total number of 0s and 1s; the latter number could also be used for ranking purposes. These shots are ranked by counting the total number of contiguous 1s; in order to make this ranking more effective we post-process the strings of 0s and 1s, as explained before. After this the shots are ranked. Following is an example of ranking for subsequent shots:

shot04 144 227 shot06 4 31 shot03 1 25 shot05 53 59.

Shot #04 has the longest string of contiguous 1s, from frame 144 to frame 227, followed by shot #06, shot #03 and shot #05.

Thus the present invention provides a method of classifying and searching video databases based on 3-D camera motion parameters which provides a descriptor for indexing video shots according to the occurrence of particular camera motions and their degree.

What is claimed is:

1. A method of indexing and searching a video database containing a plurality of video shots comprising the steps of:

for each video shot estimating 3-D camera motion parameters from successive pairs of images in the video shot;

computing a rate of motion for each image from the video shot using the 3-D camera motion parameters;

indexing the video shot by types of camera motion based on the rate of motion and a sign of the 3-D camera motion parameters; and repeating the estimating, computing and indexing steps for each video shot in the video database, wherein said estimation step comprises the additional steps of:

computing image feature points from each consecutive pair of images in the video shot;

computing image intensity contrast variation to select pixels from the images to be used;

tracking the image feature points from image to image in the given shot to identify matched feature points;

pruning the matched feature points using the image intensity contrast variation; and computing iteratively from the matched feature points a best set of matrices representing translation and rotation of the images.

2. The method as recited in claim 1 further comprising the step of searching for video shots within the video database based on a selected one of the types of camera motion.

3. The method as recited in claim 2 wherein the types of camera motion are selected from the group consisting of tracking, booming, dollying, panning, rolling, tilting and zooming.

4. The method as recited in claim 1 wherein the computing step comprises the steps of:

computing rates of tracking, booming and dollying from the translation matrix for each image feature point;

computing a focus of interest as a point in each image at which all image motions converge as a function of the translation matrix; and obtaining a vector descriptor for each consecutive pair of images as a function of the rates of tracking, booming and zooming, and the focus of interest as the rate of motion.

5. The method as recited in claim 4 wherein the indexing step comprises the steps of:

computing how much larger the tracking and booming rates are compared to the dollying rate as a first ratio;

computing how much larger the dollying rate is compared to the tracking and booming rates as a second ratio;

generating an index file for the video shot containing a string of ones and zeros for each of the types of camera motion.

6. The method as recited in claim 5 wherein the searching step comprises the steps of:

querying the video database with a selected one of the types of camera motion;

processing the selected one of the types of camera motion to find the video shots satisfying selected one of the types of camera motion; and displaying the video shots satisfying the processing step.

* * * * *